United States Patent [19]

Herrington

[11] Patent Number: 4,721,502
[45] Date of Patent: Jan. 26, 1988

[54] APPARATUS FOR SEALING A HEM IN A MOVING WEB OF FILM

[75] Inventor: Fox J. Herrington, Holcomb, N.Y.

[73] Assignee: Mobil Oil Corporation, New York, N.Y.

[21] Appl. No.: 904,441

[22] Filed: Sep. 8, 1986

[51] Int. Cl.$^4$ .................. B31B 23/64; B31B 23/86
[52] U.S. Cl. .................... 493/193; 493/208; 493/225; 493/381; 493/386; 493/394; 493/928; 156/583.1; 156/583.3; 156/583.4; 156/583.91
[58] Field of Search ............... 493/205, 206, 207, 208, 493/209, 189, 190, 191, 192, 193, 197, 202, 225, 226, 381, 386, 394, 406, 470, 471, 928; 156/582, 583.1, 583.4, 583.7, 583.8, 583.9, 583.91

[56] References Cited

U.S. PATENT DOCUMENTS

| | | | |
|---|---|---|---|
| 2,125,758 | 8/1938 | Waters | 493/197 |
| 2,242,799 | 5/1941 | Moore | 493/208 |
| 2,741,956 | 4/1956 | Diffenbaugh | 493/208 |
| 2,897,729 | 8/1959 | Ashton et al. | 493/196 |
| 2,971,874 | 2/1961 | Canno | 493/197 |
| 3,029,853 | 4/1962 | Piazze | 383/75 |
| 3,058,402 | 10/1962 | Kugler | 493/196 |
| 3,058,403 | 10/1962 | Kugler | 493/194 |
| 3,406,610 | 10/1968 | Golden | 493/196 |
| 3,414,032 | 12/1968 | Jortikka | 383/26 |
| 3,575,766 | 4/1971 | McArthur et al. | 156/583.1 |
| 3,759,772 | 9/1973 | Andersson | 156/270 |
| 3,844,090 | 10/1974 | Pepmeier | 493/197 |
| 3,935,048 | 1/1976 | Rucker | 493/205 |
| 4,140,046 | 2/1979 | Marbach | 493/209 |
| 4,202,721 | 5/1980 | Roberts | 156/358 |

FOREIGN PATENT DOCUMENTS

| | | | |
|---|---|---|---|
| 2732085 | 1/1979 | Fed. Rep. of Germany | 156/583.1 |
| 2833119 | 2/1980 | Fed. Rep. of Germany | 156/583.1 |
| 1125363 | 8/1968 | United Kingdom | |

Primary Examiner—Frederick R. Schmidt
Assistant Examiner—William E. Terrell
Attorney, Agent, or Firm—Alexander J. McKillop; Michael G. Gilman; Charles J. Speciale

[57] ABSTRACT

Apparatus for sealing a hem in a moving web of plastic film having a structure including a folding surface having a web passing on one side of the surface and an edge of the web on the other side of the surface to produce a hem in the web prior to leaving the surface. Heat sealing apparatus is supported adjacent the structure for heat sealing the hem while the web is moving and prior to the sealed hem leaving the surface. The surface is provided with an opening in alignment with the heat sealing apparatus and the heat sealing apparatus seals the hem through the opening. The heat sealing apparatus includes a plurality of heated rollers supported on one side of the structure, the rollers being adapted to extend through the opening in the surface and backup rollers are positioned on the opposite side of the structure and in alignment with the opening for cooperation with the heated rollers to engage the opposite sides of the hem for heat sealing the hem while the web is moving and prior to the sealed hem leaving the surface.

13 Claims, 15 Drawing Figures

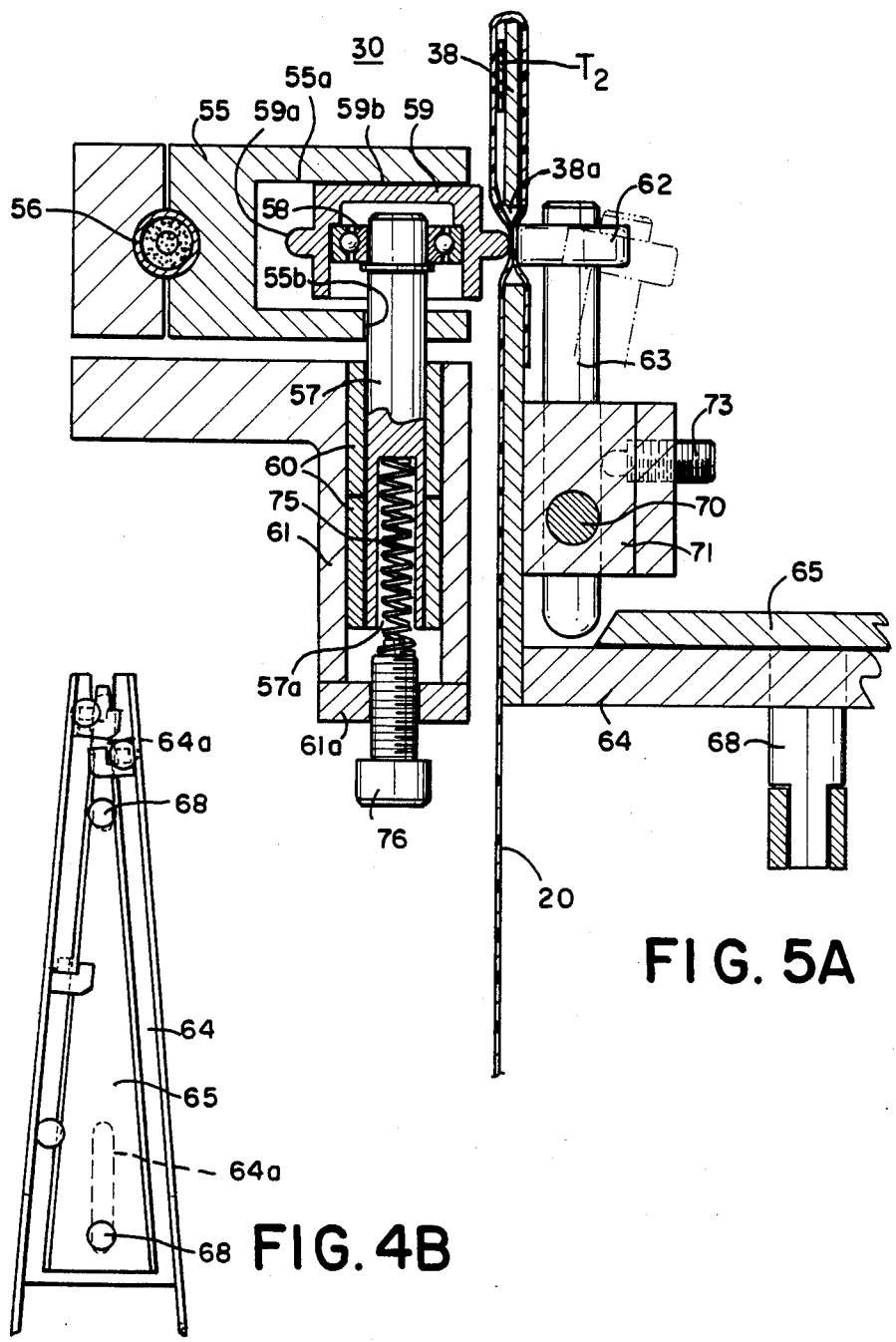

4,721,502

APPARATUS FOR SEALING A HEM IN A MOVING WEB OF FILM

BACKGROUND OF THE INVENTION

This invention relates to apparatus for sealing a hem in a moving web of film and more particularly to the manufacture of draw tape plastic bags.

Bags made of thin polyethylene materials have been used in various sizes. Small bags are used in the packaging of samples and the like. Larger bags are used as shopping bags; and even larger bags are used for containing trash.

A particularly advantageous closure for such a bag includes a draw tape constructed from the same polyethylene material. U.S. Pat. Nos. 3,029,853—Piazzi and 1,125,363—Jortikka are examples of draw tape bags. Such closures have been successfully employed on these bags.

Draw tape closures for large trash bags, and the manufacture of these draw tape trash bags, are described in the related applications identified below.

Forming the hem, into which the tape is inserted, is shown for example, in U.S. Pat. Nos. 2,897 729—Ashton et al 3,058,402—Kugler, 3,058,403—Kugler, and in copending patent applications of applicant's assignee including "METHOD AND APPARATUS FOR FORMING HEMS IN SUPERPOSED PLIABLE PANELS," Boyd et al, Ser. No. 652,255, filed Sept. 20, 1984 now U.S. Pat. No. 4,617,008 and in "HEM FOLDER WITH INTEGRAL TAPE INSERTER FOR MAKING DRAW TAPE BAGS," Herrington, Ser. No. 871,238 filed June 6, 1986.

Draw tape hems have been previously made by various methods. One method is to use a Teflon-coated hot bar which opens and closes against the film in the area of the bag machine where the film starts and stops. The bar closes once during each cycle while the film is stopped. A second method is to blow a series of hot air jets against the film as it travels by. Bag closures for use in the field use a pair of heated belts to produce a machine-direction seal. In the hot bar method, the hot bar is located far downstream from where the tape is inserted into the hem and also where the hem is folded, so there has been an opportunity for the tape and the hem to wander by the time it reaches the sealer. This requires making the hem wider to allow for this wandering movement. This is costly in wasted material, produces a weak tape seal at the side edges of the bag, and also makes a sloppy bag. The hot air sealer can be used on a continuously moving web, but it is very sensitive to wrinkles. The heating of the film by the air jets also causes some wrinkling which cannot easily be prevented since the film is not mechanically constrained. As a result the hem seals made by these techniques are not reliable, particularly where thin films, in the order of one mil, are used.

It is an object of the present invention to seal a hem in a web of film moving at a relatively high speed, such as 250-300 ft./min, where the seal in the hem is produced as close as possible to where the hem is folded and the tape inserted, and while the film is still held flat on the folding surface so there are no wrinkles in the hem.

It is a further object of the present invention to seal hems in the opposing panels of a moving web of folded thermoplastic film in the manufacture of draw tape bags.

RELATED APPLICATIONS

METHOD AND APPARATUS FOR MANUFACTURING DRAW TAPE, BAGS, Boyd, et al, Ser. No. 652,254, filed Sept. 20, 1984, now U.S. Pat. No. 4,624,654 describes an overall draw tape bag manufacturing line; METHOD AND APPARATUS FOR FORMING HEMS IN SUPERPOSED PLIABLE PANELS, Boyd et al, Ser. No. 652,255, filed Sept. 20, 1984, now U.S. Pat. No. 4,617,008 describes a hem forming apparatus used with the line; INSERTION OF DRAW TAPE STRIPS IN DRAW TAPE BAG MANUFACTURE, Boyd et al, Ser. No. 652,252, filed Sept. 20, 1984, now U.S. Pat. No. 4,597,750 describes apparatus for inserting a draw tape into the bag; HEM FOLDER WITH INTEGRAL TAPE INSERTER FOR MAKING DRAW TAPES, Herrington, Ser. No. 871,238 filed June 6, 1986 describes apparatus for folding a hem and inserting a draw tape into the bag; APPARATUS FOR SEALING A HEM IN A MOVING WEB OF FILM USING ANGULARLY ORIENTED HOT WHEELS, Herrington et al, Ser. No. 904,449 filed concurrently herewith; APPARATUS FOR PRODUCING A MACHINE-DIRECTION HEAT SEAL, Herrington, Ser. No. 904,441 filed concurrently herewith.

SUMMARY OF THE INVENTION

In apparatus for sealing a hem in a moving web of film, the web of film is passed on one side of a structure including a folding surface, the edge of the web is tucked onto the other side of the surface to produce a hem in the web prior to leaving the surface and heat sealing means are supported adjacent the structure for sealing the hem while the web is moving and prior to the sealed hem leaving the surface. The structure including the folding surface preferably has an opening in the surface in alignment with the heat sealing means and the heat sealing means comprises a plurality of heated rollers supported on one side of the structure. The rollers are adapted to extend through the opening in the surface and backup means are positioned on the opposite side of the structure and in alignment with the opening for cooperation with the rollers to engage the opposite sides of the hem for heat sealing the hem while the web is moving and prior to the hem leaving the surface. The foregoing apparatus preferably is incorporated in a machine for making bags from thermoplastic film wherein the structure includes two of the folding surfaces, a layer of the web of film passing over one side of each surface so that the hem is formed in each of the two layers of the web. A tape is fed into each of the hems while the web is on the surfaces and means is supported adjacent each of the surfaces for heat sealing the hems to seal the tape therein while the web is moving and prior to the sealed hem leaving the surfaces.

The foregoing and other objects, features and advantages of the invention will be better understood from the following, more detailed description and appended claims.

SHORT DESCRIPTION OF THE DRAWINGS

FIG. 4B is a fractional view taken along the lines 4B—4B in FIG. 4A;

FIG. 5A is a cross-sectional view taken along the lines 5A—5A in FIG. 5.

DESCRIPTION OF SPECIFIC EMBODIMENTS

Figure 1:
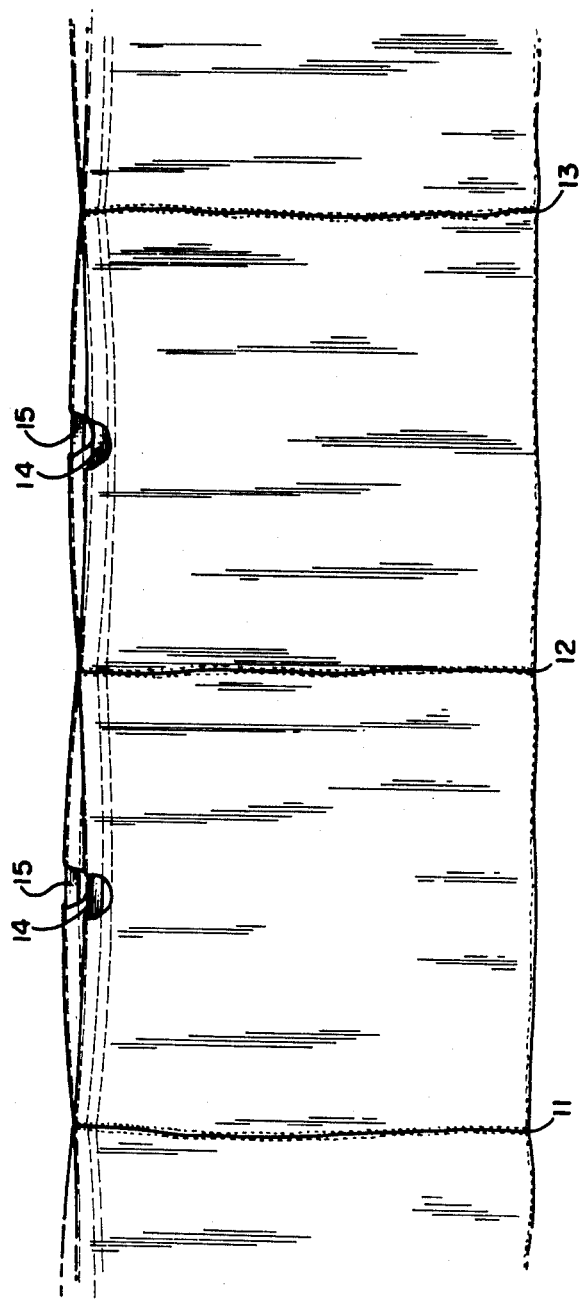
FIG. 1 shows a series of draw tape bags made in accordance with the present invention.

FIG. 1 shows a series of draw tape bags formed from an extruded tube of polyethylene. The tube is slit along one side to form open tops in the bag for reception of trash and the like. The tube of film is folded along the other side to form the bag bottoms. The sides of the panels are heat sealed and cut from the tube in a perpendicular direction at 11, 12 and 13 to form individual bags.

Hemmed portions of each opposing panel are folded over adjacent the top. The draw tape bag construction as thus far described has hemmed portions that are narrower resulting in a saving of material and thus reduction in overall cost as later to be described in detail. Draw tapes 14 and 15 are inserted in the hems and are secured by the heat seal at the sides of the panels. Tape holes are cut in each panel exposing the draw tape so that they can be grasped. The distance from the bottom of the bags to the top is referred to as "web width" or "bag length" herein.

Figure 2:
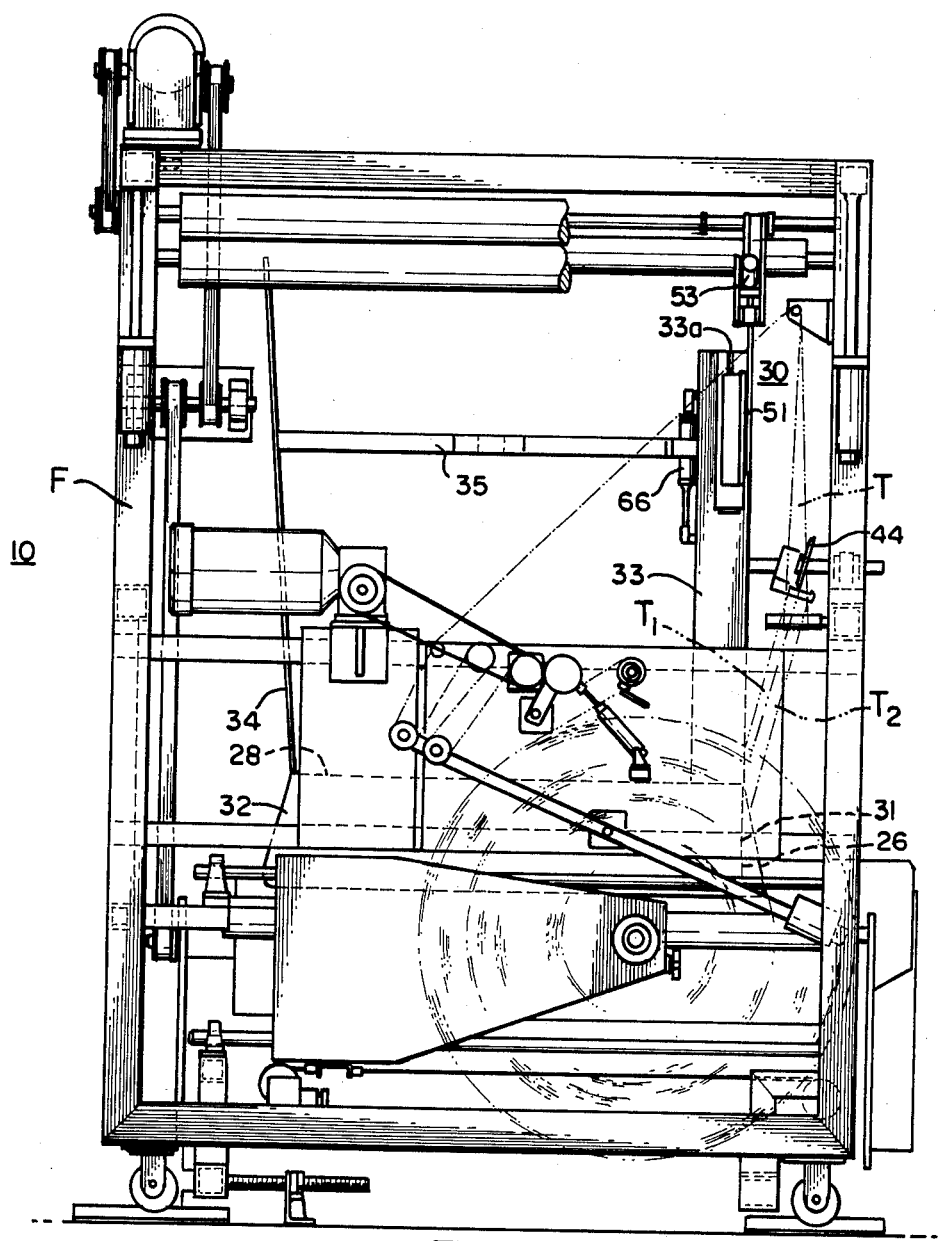
FIG. 2 is a side elevation view of a machine embodying the hem sealing apparatus of the present invention.
Figure 3:
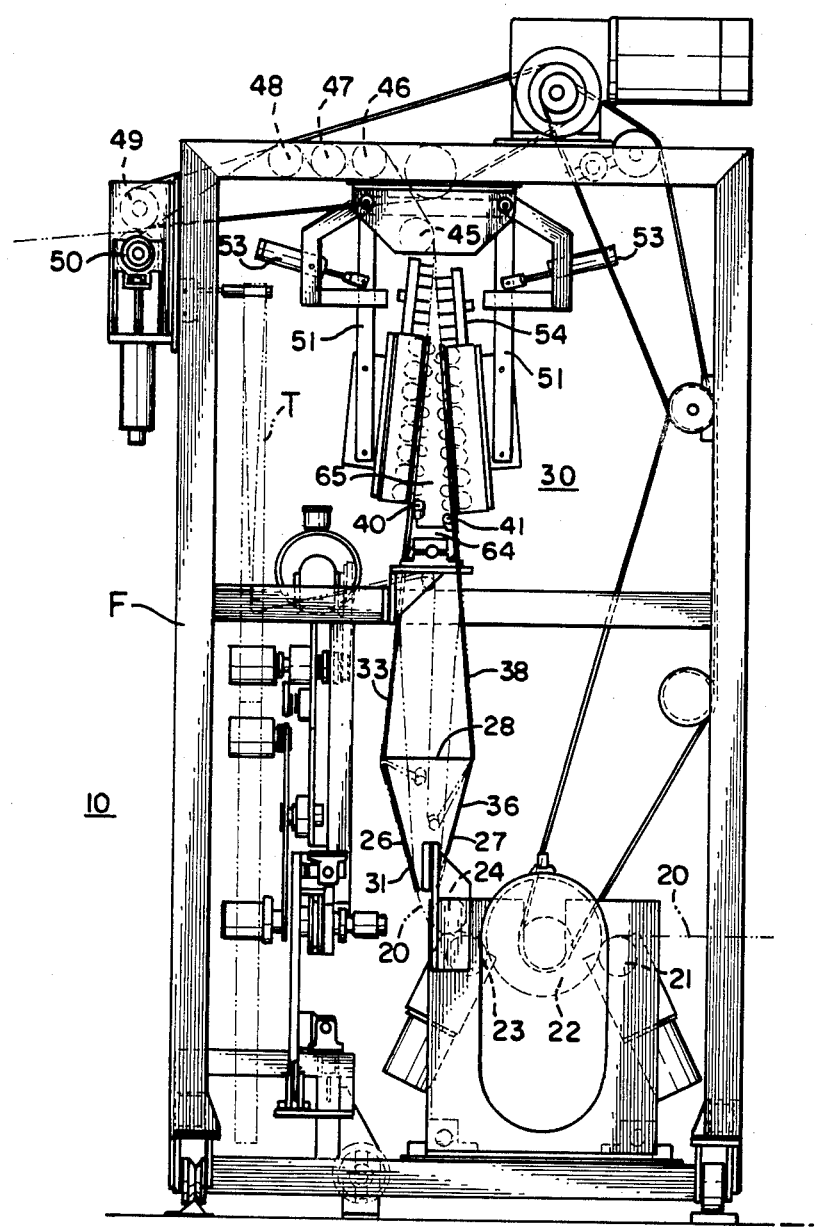
FIG. 3 is a front elevation view of the machine of FIG. 2.

FIGS. 2 and 3 illustrate a machine 10 embodying the apparatus of the present invention for sealing a hem in a moving web of film. A moving web of film 20 is formed from an extruded tube of polyethylene which has been slit on the side facing the viewer in FIG. 3 and folded on the other side to form two opposing layers of film. This moving web 20 enters the machine 10 through rollers 21, 22, 23 and 24, with the roller 23 having punch elements which form the holes for grasping the tape.

The hem forming apparatus illustrated in FIGS. 2 and 3 includes supporting structure F having two folding surfaces 26 and 27 which are flat and converge outwardly from the feed rolls 21–24 to a point of maximum separation at 28 and then converge inwardly to a point of close separation adjacent the hem sealing apparatus 30. The folding surface 26, FIG. 2, is made up of a lower hem plate 31, a lead-in plate 32, an upper hem plate 33 and the edge of a bottom plate 34 which is separated from the upper hem plate 33 by a spacer 35 and the lead-in plate 32. The lead in plate 32 and the lower hem plate 31 are both in the same plane and diverge outwardly to the point 28 as shown in FIG. 3. The other surface 27 includes a lower hem plate 36, a lead in plate similar to plate 32 and in the same plane as plate 36, an upper hem plate 38 and the opposite edge of the bottom plate 34. The bottom plate 34 is triangularly shaped having its base along the line 28 in FIG. 3 and its apex adjacent the upper end of the hem plates 33 and 38.

When the web 20 impinges on the surfaces 26 and 27, FIG. 3, the folded edge of the web 20 which is to form the bottom of the bags will pass over the bottom plate 34 as shown in FIG. 2. A layer of the film passes over the outside of each of the surfaces 26 and 27 and the split edges of the film are tucked onto the other side of each surface to produce a hem in each opposing layer of film. The rollers 40, 41, FIGS. 3 and 4, supported in relation to the hem plates 33 and 38 maintain the moving web of film tightly around the respective surfaces 26 and 27 and against the opposite sides thereof to avoid formation of wrinkles in the film during the heat sealing of the hems, FIGS. 3 and 4.

Slots, not shown, are provided in the lower hem plates 31 and 36, to receive the tapes T1 and T2 which are inserted into the hems of the moving web of film. A tape splitter 44 produces the two tapes T1 and T2 from a single tape T. The hem sealing apparatus 30 seals the folded over hem portion to the side panel of the bag so that the draw tap is secured in the hem of the bag. After the film leaves the hem sealing apparatus 30 it passes through nip rolls 46–48 and then through rolls 49 and 50 to the further processing steps of side sealing and cutting into individual bags. The present invention is concerned with the improved apparatus for sealing a hem in a moving web of film while the web is moving and preferably prior to the hem leaving the sealed hem folding surface. See FIGS. 3, 4A, 5A, 6, 8A and 9A.

Figure 4:
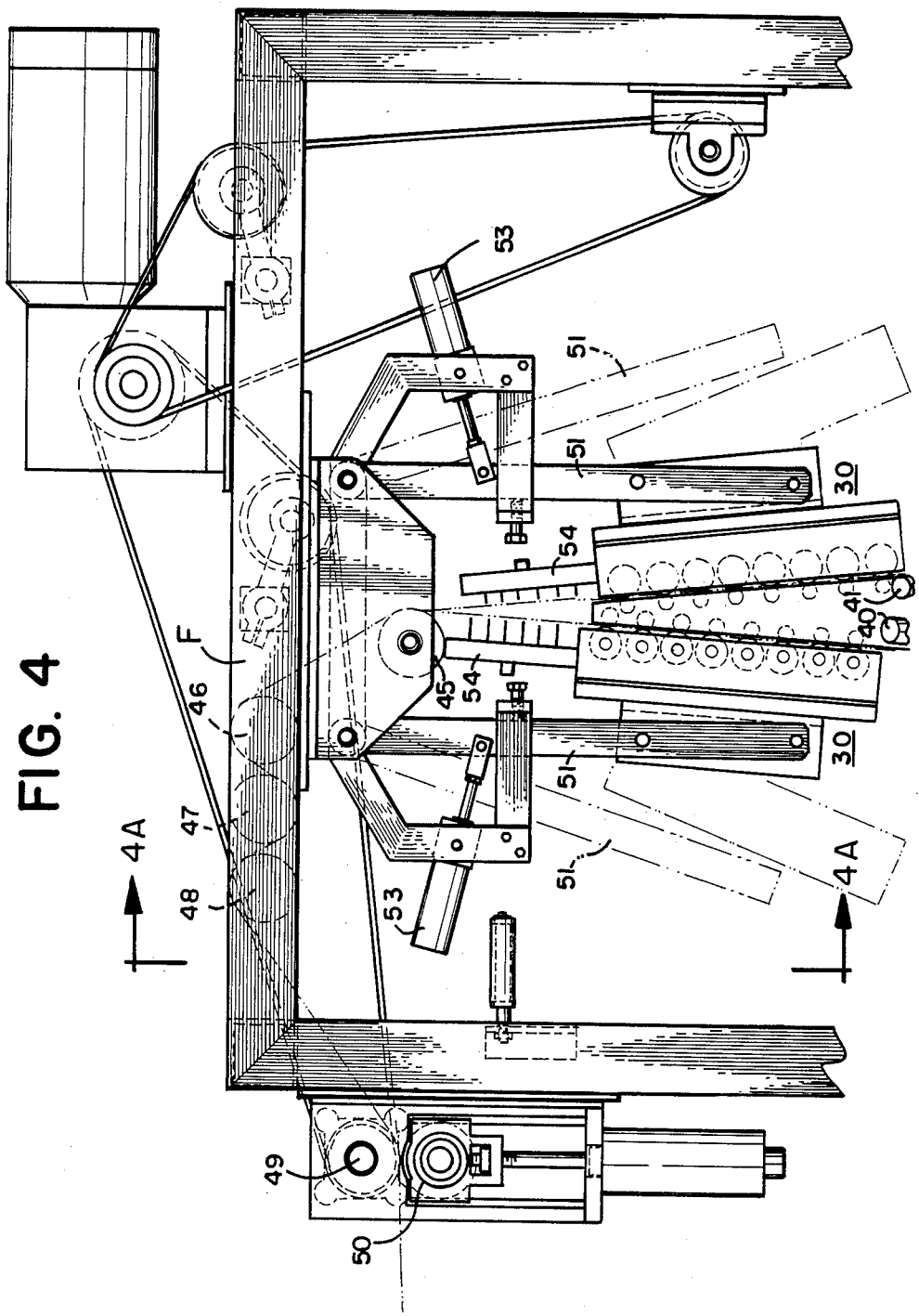
FIGS. 4 is a fractional view on enlarged scale of the upper portion of the machine embodying the hem sealing apparatus shown in FIG. 3.
Figure 4A:
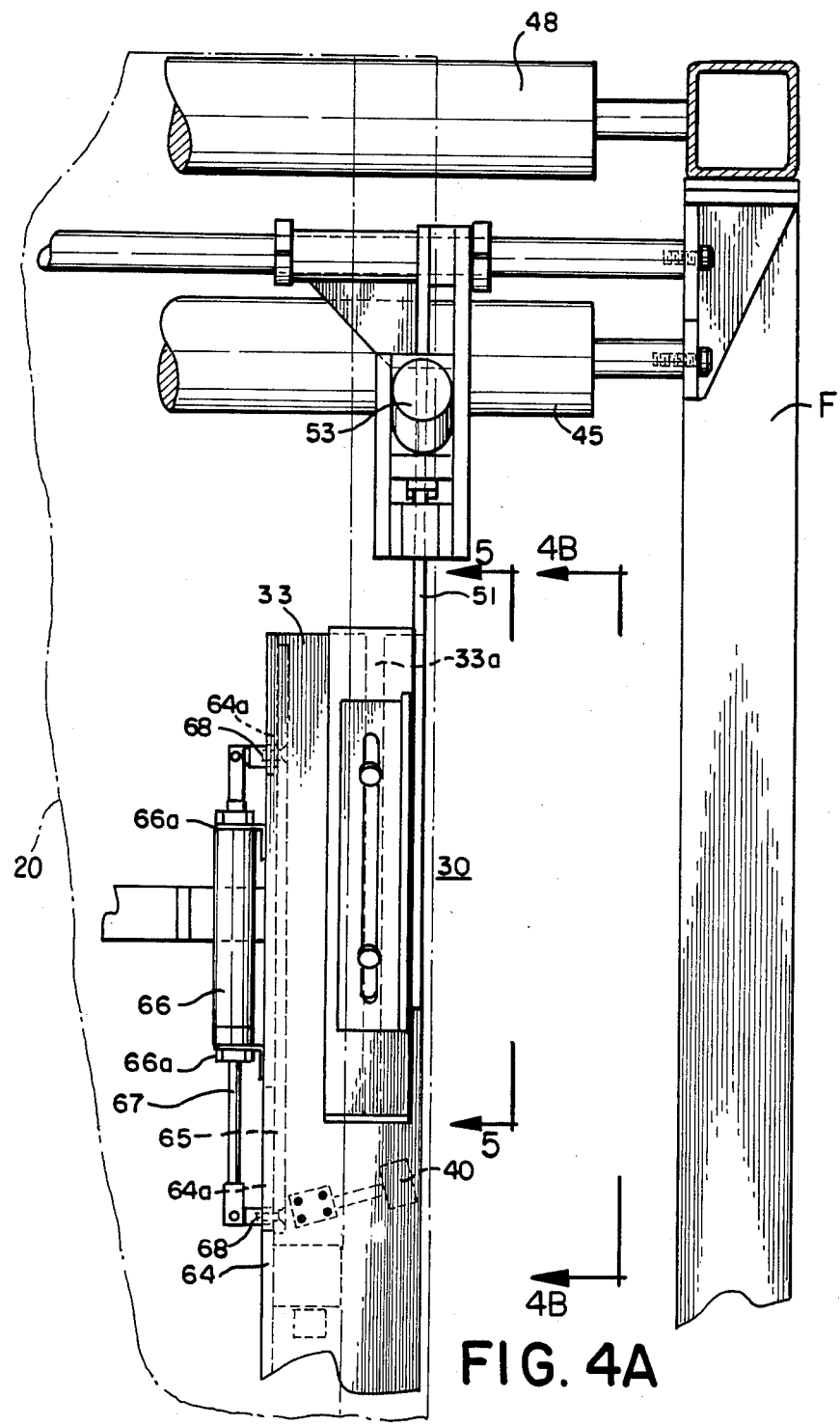
FIG. 4A is a fractional view on enlarged scale taken along the lines 4A—4A in FIG. 4.
Figure 5:
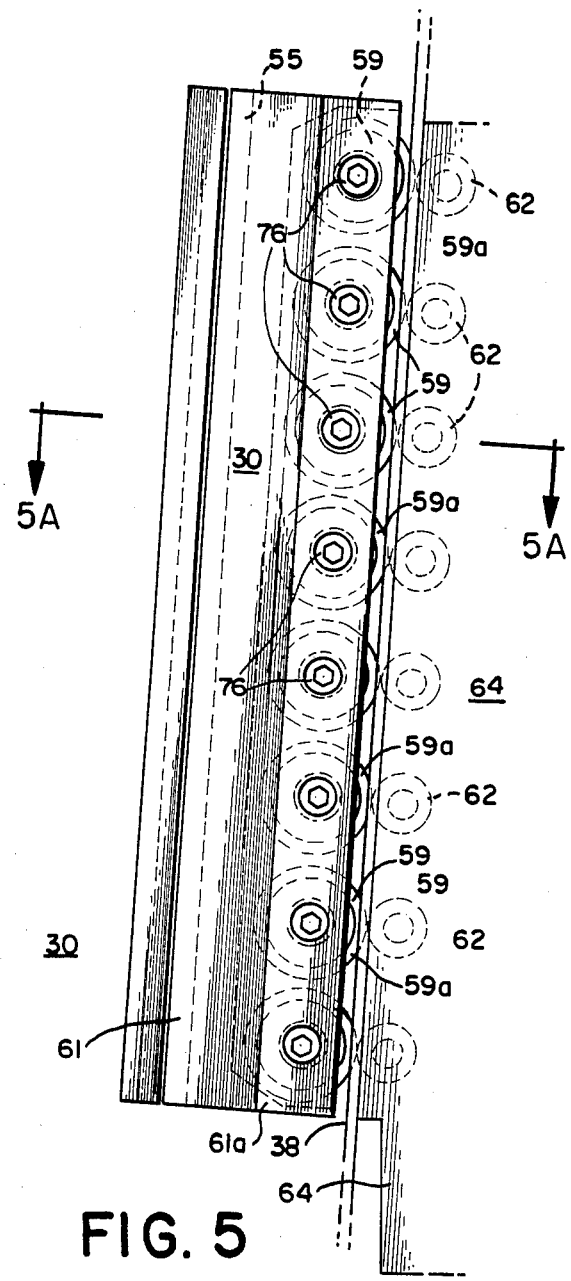
FIG. 5 is an elevational view of the hem sealing apparatus shown in FIG. 4A taken along the lines 5—5.

As shown in FIGS. 2 and 4A the upper hem plate 33 has an opening in the form of a longitudinal slot 33a therein near the upper end of the plate. The other hem plate 38 has a similar opening or slot 38a therethrough and both of these openings are positioned in alignment with the heat sealing apparatus 30. The heat sealing apparatus 30 comprises two similar sealing units, one mounted with respect to each of the upper hem plates 33 and 38, FIGS. 2–4A. As may be seen in FIG. 4 the sealing units of the heat sealing apparatus 30 are carried by adjustable brackets 51 which depend from a stationary bracket 52 secured to the top of the frame F. The adjustable brackets 51 are adapted to be moved between their full line position and their broken line position in FIG. 4 by means of actuators 53 in the form of air cylinders. When the brackets 51 are in full line position as shown in FIG. 4 the respective sealing units of the heat sealing apparatus 30 are in fixed position with respect to the upper hem plates 33 and 38. This is the normal operating position for the heat sealing units during the manufacture of the draw tape plastic bags. After the heat sealed hems leave the heat sealing apparatus 30 they pass between cooling members 54 which comprise a plurality of air jets for directing cooling air against the heat sealed areas of the seams to cool the seams so as to prevent stretching of the film as it is pulled over roll 45 and through rolls 46–50 to the further processing steps of side sealing and cutting into individual bags. The details of one embodiment the heat sealing apparatus are best seen in FIGS. 5 and 5A where they are illustrated in connection with the hem plate 38. As may be seen in FIG. 5A the heat sealing apparatus 30 includes a heating block 55 through which extends an electric heating element 56 which preferably is thermostatically controlled to control the temperature of the block 55. The block 55 is provided with a plurality of openings 55b, FIG. 5A, through which extend a corresponding number of shafts 57 on which are mounted ball bearings 58 and on which in turn are mounted rollers or wheels 59. Each of the rollers 59 is provided with an annular projection or rim 59a the purpose of which will be hereinafter described. The shafts 57 are mounted in sleeve bearings 60 within a housing 61 having an end plate 61a. The housing 61 is mounted with respect to the hem plate 38 such that the projections 59a on the wheels 59 are in alignment with an extend into the slot 38a on the hem plate 38. Mounted at the opposite side of the hem plate 38 and in alignment with the slot 38a is a plurality of rubber rollers 62, one being shown in FIG. 5A, which are spring biased and are adapted to extend into the slot 38a and cooperate with the corresponding plurality of rollers 59 in heat sealing the hem in the web.

As may be seen in FIGS. 3, 4A and 4B the hem plates 33 and 38 are maintained in spaced relation by a plate 64 on which is mounted an adjustable wedge 65 which is adapted for vertical movement by an air cylinder 66, FIG. 2. The air cylinder 66 is mounted on the plate 64. The opposite ends of a rod 67 in the air cylinder are connected to the wedge 65. When the air cylinder 66 is actuated, the plunger 67 may move the wedge 65 vertically a predetermined distance. As may be seen in FIG. 5A the sides of the wedge 65 are beveled and adapted to engage the ends of the shafts 63 which carry the rollers 62. The shafts 63 are carried by pivots 70 which in turn are carried by blocks 71 secured to the hem plates, as illustrated by hem plate 38 in FIG. 5A. The blocks 71 also are provided with spring loaded detents 73 which engage the shafts 63 for the rollers 62. The spring loaded detents are adjustable so as to vary the amount of spring loading on the shafts 63. When the wedge 65 is moved upwardly from its position shown in FIGS. 4A and 4B, the wedge engages the ends of the shafts 63 causing the rollers 62 to be moved out of engagement with the web and thus out of the slot 38a as shown in phantom lines in FIG. 5A. While the forgoing arrangement has been described in connection with the hem plate 38, it is to be understood that similar parts both for the heated rollers 59 and the rubber backup rollers 62 are utilized in connection with the other hem plate 33.

By the time the web of film 20 has moved upwardly over the folding surfaces 26 and 27, FIGS. 2 and 3, the layer of the film moving over the surface 27 will have moved onto the folding plate 38 where the film is folded around the edge of the plate 38 to form a hem with a tape T2, FIG. 5A inserted therein as previously described. When the hem reaches the lower end of the sealing apparatus 30, FIGS. 3, 4 and 5, the projections 59a on the heated rollers 59 cooperate with the spring biased rubber rollers 62 to engage the opposite sides of the hem and form a heat seal longitudinally of the web.

The wheels 59 are heated by means of conduction from the heater block 55, the temperature of which is thermostatically controlled by the heating element 56, FIG. 5A. As may be seen in FIG. 5A, the shaft 57 is provided with a bore 57a which is adapted to receive a compression spring 75. The end plate 61a has a threaded opening into which extends an adjustable screw 76 which is adapted to engage the end of the compression spring 75. The opposite end of the compression spring 75 engages the shaft 57 at the end of the bore 57a and thus by adjusting the screw 76 the compression the spring 75 can likewise be adjusted thereby forcing the shaft 57 in an upward direction as viewed in FIG. 5A. This causes the wheel 59 to have its flat face 59b maintained in engagement with the inner wall 55a of the heater block 55. The force of the spring 75 maintains the face of the wheels 59 in contact with the heater block 55 thus ensuring heat transfer from the heater block 55 to each wheel 59. The adjustable screws 76 have the advantage of being able to minimize the longitudinal force applied to the shafts 57 while maintaining good thermal contact between the wheels 59 and the heater block 55. The heater block 55 is shaped to provide a housing for the wheels 59 to concentrate the heat around the wheels. As may be seen in FIG. 5 eight wheels 59 are utilized in sealing the hem. By using a plurality of heat sealing rollers or wheels 59, the heat required for sealing the hem can be delivered to the film in smaller increments since eight wheels are supplying the heat rather than one. If only one wheel were being utilized it would be necessary to heat the single wheel to higher temperature or to operate the speed of the film at a slower speed in order to complete the seal.

It has been determined by calculation that the creation of a seal 3/16" wide at 300 ft./min. on two layers of 1.3-mil film requires the transfer of 7 Btu/min of heat into the film. This same amount of heat must likewise be transferred from the heated block into the wheel. This cannot readily be done by hot air or by transfer through the bearings of the wheel. In accordance with the present invention hem seals were made at about 300 ft/min. speed using eight wheels, 1½" diameter, in tandem, heated to a temperature of 300°-350° F. The wheels 59 were hard anodized aluminum having Teflon coated surfaces on the rims 59a and the sides or faces 59b of the wheels which engage the Teflon coated surfaces 55a on the aluminum block 55. The rims 59a had a radius of 3/32". The eight backup wheels were ¾" diameter, 40-durometer natural rubber rollers, although silicone rubber may be preferred for durability. Since two hems are being sealed simultaneously (one for the front and one for the back of the bag) and since it is desirable to separate the layers of film as little as possible, the ¾" backup rolls 62 are alternated inside the opening between film layers, FIGS. 3 and 4, so that every other roll 62 is used as the backup for the hot wheels sealing the front of the bag, and alternate wheels are used for backup for the hot wheels 59 sealing the back of the bag. In that way, it is only necessary to separate the film layers by just over ¾". While a flat anvil backup means may be used in cooperation with the heated rollers, it has been found that the individual rubber rollers provides smoother seals.

Figure 6:
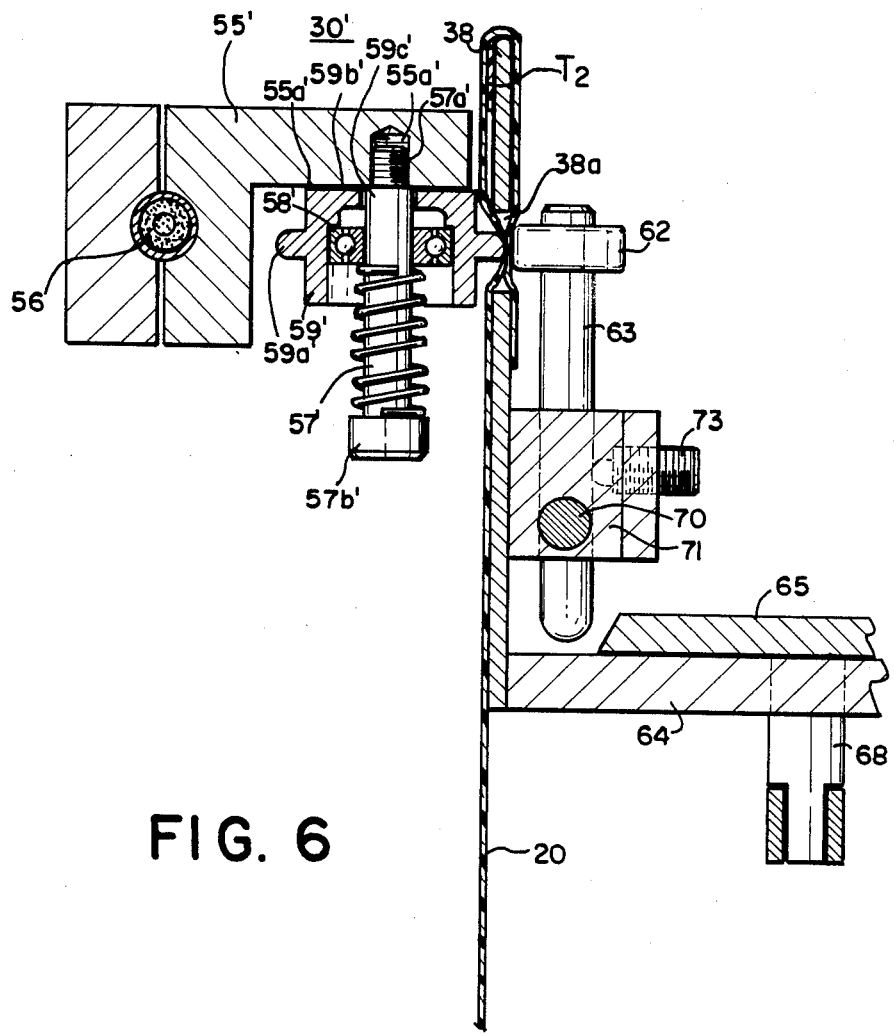
FIG. 6 is a cross-sectional view similar to FIG. 5A of a modification of the hem sealing apparatus.

Referring to FIG. 6 there is illustrated another embodiment of the heat sealing apparatus. The heat sealing apparatus 30' shown in FIG. 6 is similar to the heat sealing apparatus shown in FIGS. 5 and 5A. Corresponding parts have been provided with corresponding reference characters. The basic difference in the embodiment illustrated in FIG. 6 is in the heat sealing unit and particularly the shape of the heater block 55' and the mounting for the heated wheels or rollers 59'. As in the previous embodiment the wheels 59' are heated by means of conduction from the heater block 55' the temperature of which is thermostatically controlled by the electric heating element 56. It is to be understood that a plurality of heated rollers 59' are employed, preferably eight in number, although only one is illustrated in FIG. 6. The block 55' is provided with a plurality of threaded openings 55b,' FIG. 6, into which extend the threaded ends 57a' of the corresponding number of shafts 57' on which are mounted ball bearings 58' and on which in turn are mounted on the rollers or wheels 59'. As may be seen in FIG. 6 the shaft 57' is in the nature of a shoulder screw having a head 57b' at one end and a threaded end 57a' at the other end which is adapted to be threaded into the opening 55b' of the heated block 55'. The threaded end 57a' extends through an opening 59c' in the end face 59b' of the heated wheel 59'. The heated wheel 59' has its face 59b' maintained against the corresponding face 55a' of the heated block by means of a compression spring 75' which is placed on the shaft 57' and is maintained between the head 57b' and the bearing 58'. The compression of the spring 75' can be adjusted by any suitable means such as placing a shim washer under the head 57b' on the shaft 57' and thus vary the force of the heated wheel 59' against the heater block 55'. The heater block 55' and the heated wheels 59' are preferably of hard anodized aluminum and have Teflon coated surfaces as previously described in connection with FIG. 5A. The other parts illustrated in FIG. 6 including the backup roller 62 are the same as those illustrated in the embodiment shown in FIG. 5A and thus it is believed not necessary to repeat their description here.

Figure 7:
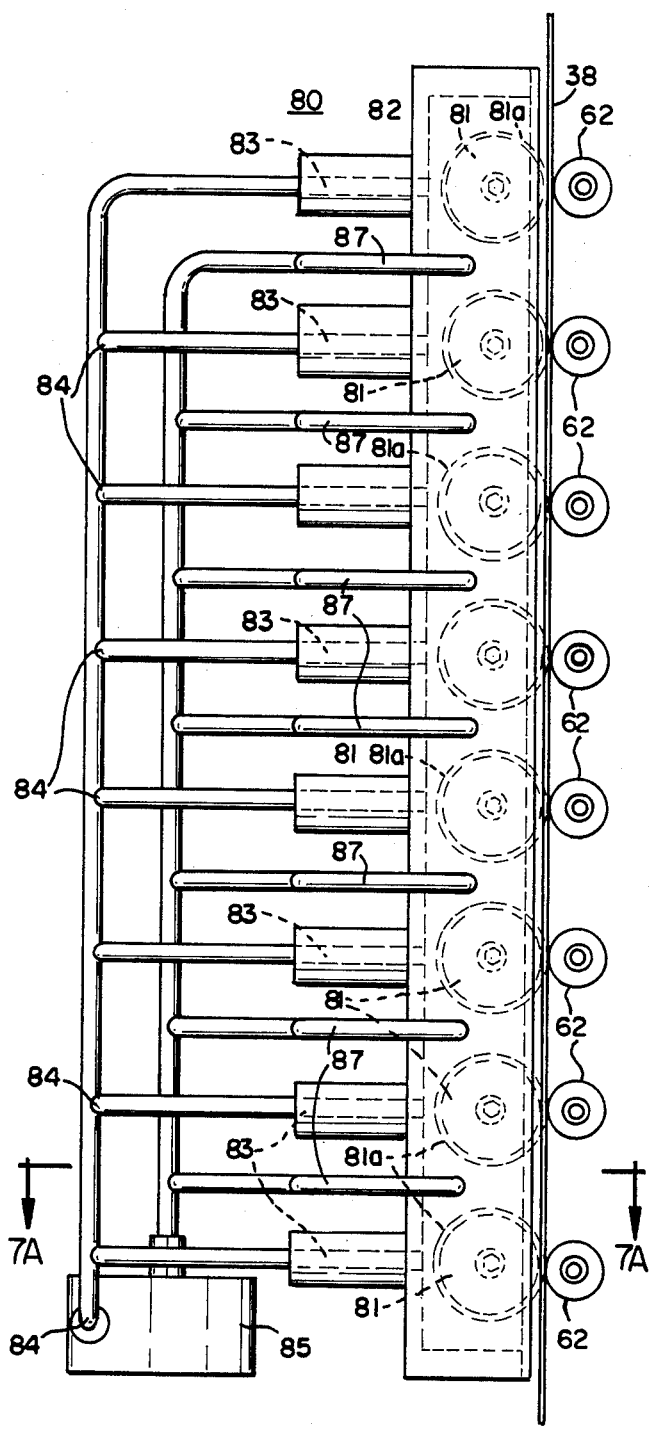
FIG. 7 is another modification of a hem sealing apparatus.
Figure 7A:
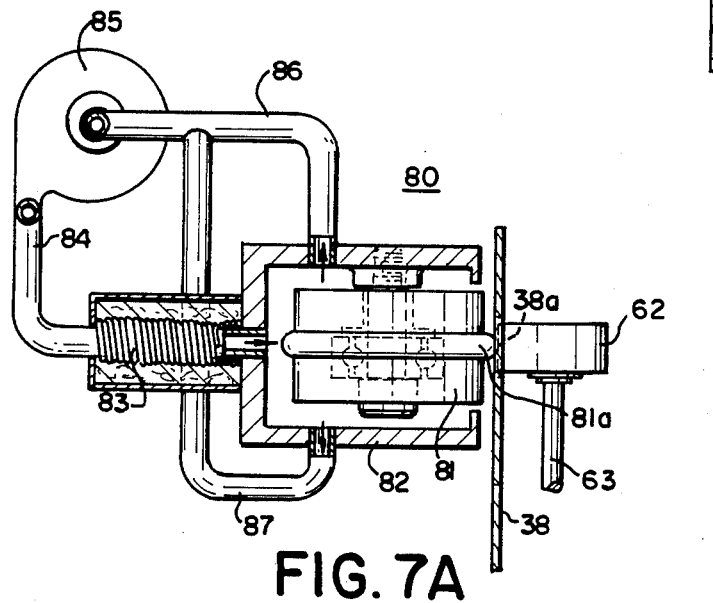
FIG. 7A is a cross-sectional view taken along the lines 7A—7A in FIG. 7.

A further embodiment of the heat sealing apparatus is illustrated in FIGS. 7 and 7A. In this embodiment there is illustrated a heat sealing apparatus 80 including a plurality of heated rollers 81 which are heated by hot air rather than by conduction. As may be seen in FIG. 7A the rollers 81 are rotatably mounted in a housing 82 which is adapted to be heated by means of a plurality of thermostatically controllable electric heating elements 83. The heating elements 83 are each connected by means of pipes 84 to a blower 85 adapted to direct air through the pipes 84 and, through the heating coils 83 into the interior of the housing 82 to heat the rollers 81. It will be noted that the warm air from within the housing 82 passes over the rollers 81 and out through the pipes 86 and 87 on the opposite sides of the rollers 81. The rollers 81 as in the previous embodiments are each provided with a projection 81a which is adapted to extend into the slot 38a on the hem plate 38 and cooperate with the spring biased rubber backup rollers 62 in forming the heat seal in the hem. As may be seen in FIG. 7 the heat sealing apparatus 80 includes eight units with heated wheels or rollers 81 and cooperating spring biased rubber backup rollers 62 mounted on the hem plates similar to backup rollers 62 shown and described in connection with FIGS. 5 and 5A. The blower 85 is adapted to blow air through each of the roller units and their corresponding heating elements 83.

Figure 8A:
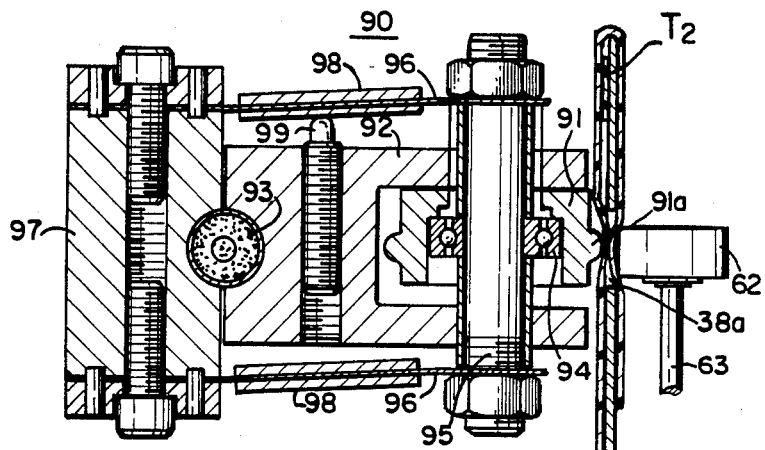
FIG. 8A is a cross-sectional view taken along the lines 8A—8A in FIG. 8.
Figure 8:
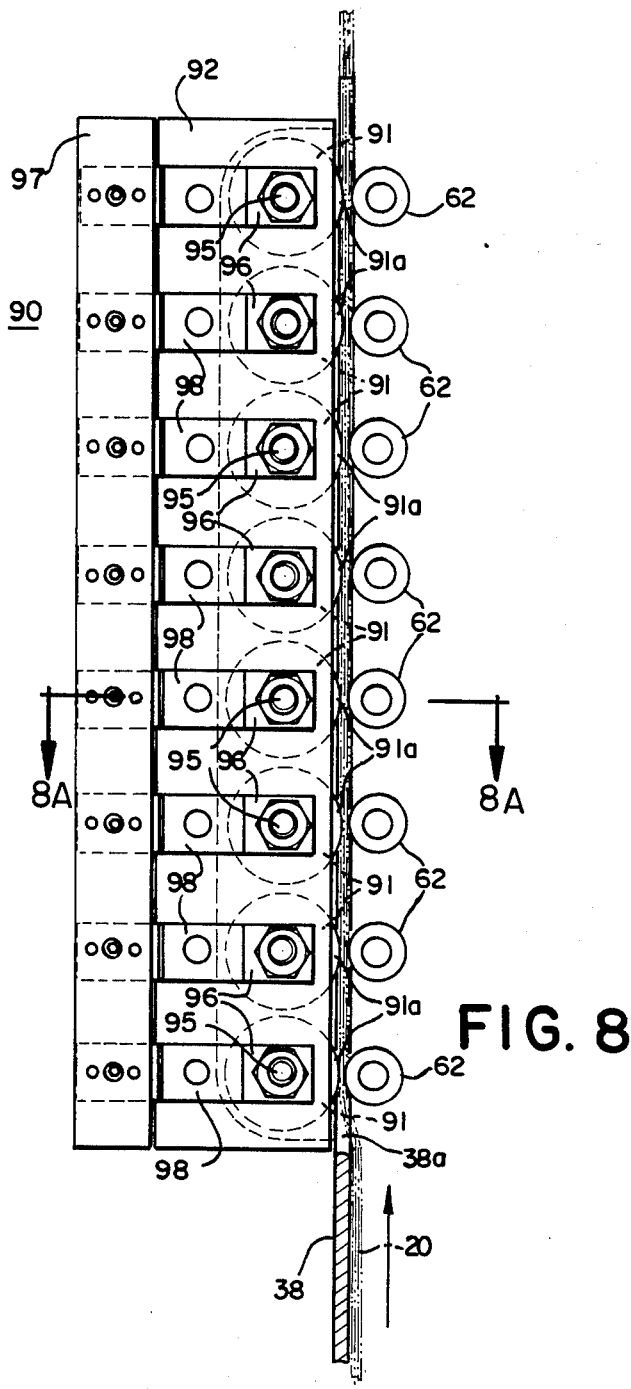
FIG. 8 is a further modification of the heat sealing apparatus embodying the present invention.

Referring to FIGS. 8 and 8A there is shown another embodiment of the heat sealing apparatus. The heat sealing apparatus 90 shown in FIGS. 8 and 8A includes a plurality of rollers or wheels 91 which in turn are heated by contact with a heating block 92 which in turn is heated by a thermostatically controlled electric heating element 93. The rollers 91 are mounted on roller bearings 84 which in turn are mounted on a shaft 95. The shaft 95 is carried by a pair of flat flexible members 96 similar to leaf springs which in turn are supported from a block 97 which also houses the heating element 93. The flexible members 96 are provided with reinforcement pads 98 to cause bending of the members 96 at the two unreinforced points. As shown in FIG. 8A the heating block 92 is provided with a threaded spring plunger 99 which is adapted adjustably to engage one of the pads 98 on one of the members 96 and thus force the roller 91 against the heating block 92 for engagement therewith. This ensures that the heat from the block 92 will be transferred by conduction to the rollers 91 and thus ensures a constant temperature for the roller 91 and particularly the annular projection or rim 91a thereon which is adapted to engage the film in heat sealing the hem. As in the previous embodiment the projection 91a is in alignment with the slot 38a in the board 38 and is adapted to cooperate with the spring biased backup rubber roller 62 which engages the opposite sides of the hem for the plastic web material. As shown in FIG. 8 the heat sealing assembly 90 is provided with a plurality of heated rollers 91, for example eight. The heating sealing apparatus 90 shown in FIGS. 8 and 8A functions in substantially the same manner as the heating sealing assembly 30 shown in FIGS. 5 and 5A.

Figures 9, 9A:
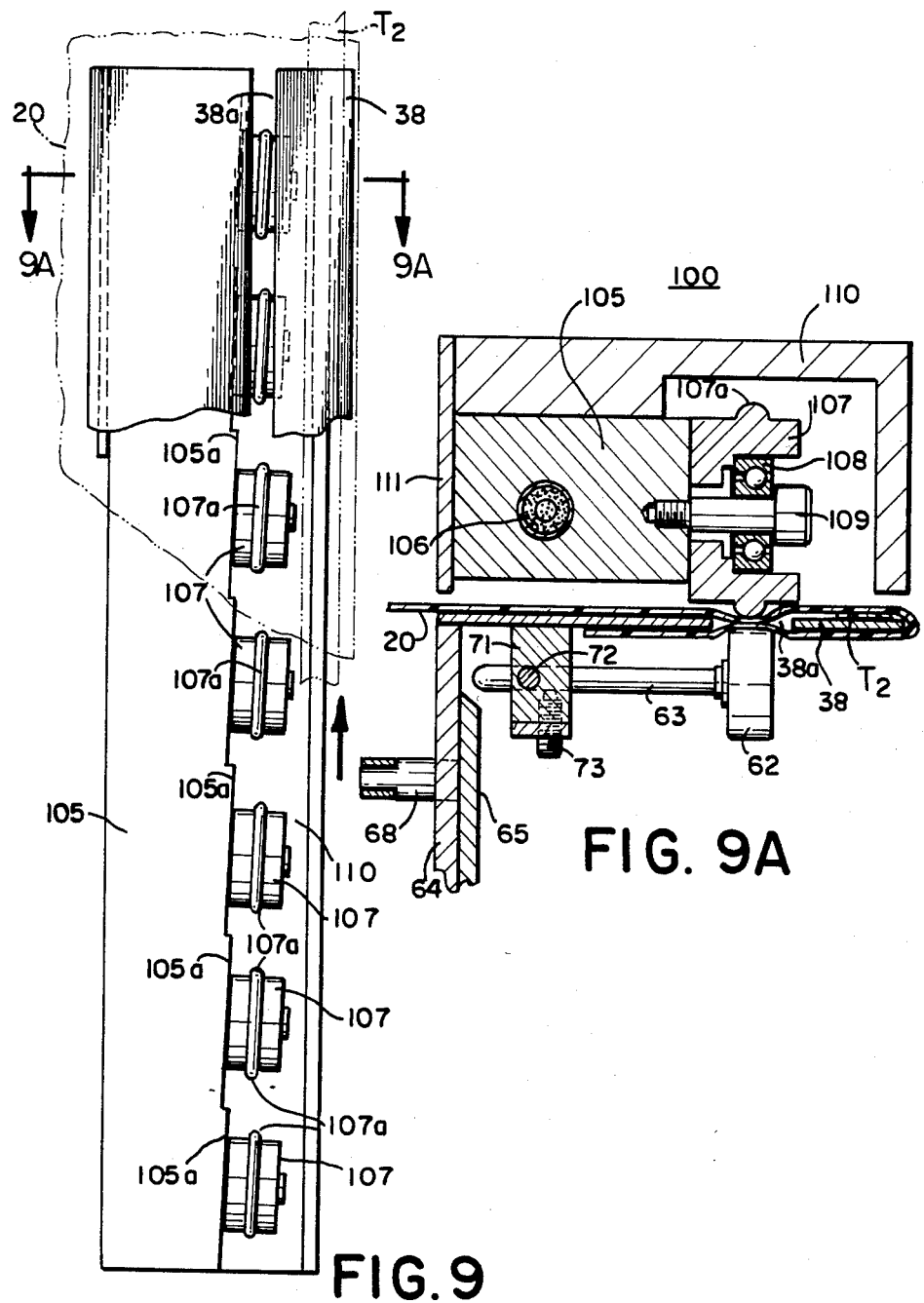
FIG. 9 is another modification of the hem sealing apparatus.
FIG. 9A is a cross-sectional view taken along the lines 9A—9A in FIG. 9.

Referring to FIGS. 9 and 9A there is illustrated another modification of the heat sealing apparatus. As may be seen in FIG. 9A the heat sealing apparatus 100 includes a heating block 105 through which extends electric heating element 106 which preferably is thermostatically controlled to control the temperature of the block 105. The block 105 is provided with a plurality of slightly angled surfaces 105a, FIG. 9, which surfaces are slightly angled with respect to the path of movement of the plastic film and the path of the heat seal. Extending from the surfaces 105a are a corresponding number of rollers or wheels 107 which in turn are mounted on ball bearings 108 which in turn are mounted on shoulder screws or shafts 109, the threaded ends of which extend through the corresponding faces 105a and are secured to the block 105. Each of the rollers 107 is provided with an annular projection or rim 107a. The heater block 105 and the rollers 107 are mounted within a housing 110 having an end plate 111. The housing 110 is mounted with respect to the hem plate 38 such that the projections 107a on the wheels 107 are in alignment with and extend into the slot 38a on the hem plate 38. Mounted at the opposite side of the hem plate 38 and in alignment with the slot 38 is a plurality of rubber rollers 62, one being shown in FIG. 9A, which are spring biased and are adapted to extend into the slot 38a and cooperate with the rollers 107 in heat sealing the hem in the web. The backup rollers 62 are mounted on the hem plate 38 as previously described in connection with FIG. 5A.

The wheels 107 are heated by means of conduction from the heater block 105, the temperature of which is thermostatically controlled by the heating elements 106, FIG. 9A. As illustrated in FIG. 9 each of the rollers 107 is mounted against a slightly angled surface 105a so that when they rotate in cooperation with the rubber backup rollers 62, they assist in maintaining a straight path of movement for the hem and thus insure a straight hem seal as the web moves through the sealing apparatus 100. Also by using a plurality of heat sealing rollers or wheels 107, the heat required for sealing the hem can be delivered to the film in smaller increments since eight wheels are supplying the heat rather than one. A further advantage of mounting the wheels 107 on the slightly angled surfaces 105a is that a slight bias force is produced in the direction of movement of the film such that the wheels are heated by contact of one or their sides against the heated block and the force holding them against the heated block is provided by the slight angled orientation of the wheels relative to the direction of film travel. It is this small force that assures contact between each wheel 107 and heated block 105 to ensure heat transfer into the wheel.

While the present invention has been described in connection with a bag making machine of the type disclosed in the present application, it is to be understood that the hem sealing apparatus embodying the present invention may be utilized in other bag making machines and in other applications for sealing a hem in a moving web of film.

What is claimed is:

1. Apparatus for sealing a hem in a panel of a moving web of folded thermoplastic film comprising:

structure including a two-sided surface having the moving web passing on one side of said surface and an edge of the web wrapped around said surface on the other side of said surface forming the hem in two layers of the web in the direction of movement of the web prior to leaving said surface, said structure having an opening in said surface extending along the path of movement of the hem;

means carried by said structure on said other side of said surface for engaging the layer of the hem wrapped around said other side for maintaining the moving web of film tightly around said surface and against the opposite sides thereof to avoid formation of wrinkles in the film during the heat sealing of the hem;

means supported adjacent said opening in said surface for heat sealing together the two web layers in the hem in the direction of movement of the web while the web is moving and prior to the sealed hem leaving said surface, said heat sealing means comprising a plurality of heated rollers mounted in tandem in the direction of movement of the web and supported at said one side of said surface, said rollers being positioned to extend through said opening in said surface; and backup means positioned on said other side of said surface in alignment with said opening for cooperation with said heated rollers to engage the opposite side of the hem for heat sealing the hem while the web is moving and prior to the sealed hem leaving said surface.

2. Apparatus according to claim 1 wherein said backup means comprises a plurality of resilient rollers corresponding in number to the plurality of heated rollers.

3. Apparatus according to claim 1 wherein said plurality of heated rollers are mounted on a block, said block having a plurality of surfaces each of which is engaged by a side of one of said rollers, means for maintaining said rollers in engagement with the surfaces of said block, and means for heating said block whereby said heated rollers are heated by conduction from said block.

4. Apparatus according to claim 3 including a housing containing said plurality of heated rollers for concentrating the heat from said block around said rollers.

5. Apparatus according to claim 1 including a pair of flexible members for supporting each of said plurality of heated rollers, a heated block associated with said rollers, and means cooperating with one of said flexible members for urging said rollers against said heated block whereby said rollers are in turn heated by conduction from said block.

6. Apparatus according to claim 1 wherein said heated rollers are heated by convection.

7. In a machine for making draw tape bags having front and back panels from thermoplastic film including apparatus for heat sealing a pair of hems in a moving web of the thermoplastic film, each of the hems comprising folded opposing layers of the web in the front and back panels comprising:

structure including a first two-sided surface having the moving web passing on one side of said surface and an edge of the web wrapped around said surface on the other side of said surface forming a first hem in the two layers of the web in the front panel in the direction of movement of the web prior to leaving said surface, said structure having an opening in said surface extending along the path of movement of the first hem;

means for feeding a draw tape into the first hem while the web in the front panel is on said surface;

means carried by said structure on said other side of said surface for engaging the layer of the first hem wrapped around said other side for maintaining the moving web of film in the front panel tightly around said surface and against the opposite sides thereof to avoid formation of wrinkles in the film during the heat sealing of the first hem;

first means supported adjacent said opening in said first surface for heat sealing together the two web layers in the first hem in the direction of movement of the web while the web is moving and prior to the sealed first hem leaving said surface, said first heat sealing means comprising a first plurality of heated rollers mounted in tandem in the direction of the movement of the web and supported at said one side of said first surface, said first rollers being positioned to extend through said opening in said surface;

said structure including a second two-sided surface having the moving web passing on one side of said surface and an edge of the web wrapped around said surface on the other side of said surface forming a second hem in the two layers of the web in the back panel in the direction of movement of the web prior to leaving said surface, said structure having an opening in said surface extending along the path of movement of the second hem;

means for feeding a draw tape into the second hem while the web in the back panel is on said surface, means carried by said structure on said other side of said surface for engaging the layer of the second hem wrapped around said other side for maintaining the moving web of film in the back panel tightly around said surface and against the opposite sides thereof to avoid formation of wrinkles in the film during the heat sealing of the second hem;

second means supported adjacent said opening in said second surface for heat sealing together the two web layers in the second him in the direction of movement of the web while the web is moving and prior to the sealed second hem leaving said surface, said second heat sealing means comprising a second plurality of heated rollers mounted in tandem in the direction of movement of the web and supported at said one side of said second surface said second rollers being positioned to extend through said opening in said surface; and backup means positioned between said first and second surfaces in alignment with said openings and cooperating with said pluralities of heated rollers to press together the opposing layers of film in each of the hems for heat sealing the hems while the web is moving and prior to the sealed hems leaving the respective surfaces.

8. Apparatus according to claim 7 wherein each said backup means comprises a plurality of resilient rollers corresponding in number to the plurality of heated rollers.

9. Apparatus according to claim 7 wherein each said plurality of heated rollers are mounted on a block, each said block having a plurality of surfaces each of which is engaged by a side of one of said rollers, means for maintaining said rollers in engagement with the surfaces of said block, and means for heating each said block whereby said heated rollers are heated by conduction from said block.

10. Apparatus according to claim 9 including housing means containing each said plurality of heated rollers for concentrating the heat from said block around said rollers.

11. Apparatus according to claim 7 including a pair of flexible members for supporting each of said plurality of heated rollers, a heated block associated with said rollers and means cooperating with one of said flexible members for urging said rollers against said heated block whereby said rollers are in turn heated by conduction from said block.

12. Apparatus according to claim 7 wherein said rollers are heated by convection.

13. Apparatus according to claim 7 including means for moving each plurality of heated rollers into and out of engagement with the respective hems.

* * * * *